March 1, 1966  J. C. L. LESLIE  3,237,713
ACOUSTICAL CHAMBER
Filed July 16, 1964

Inventor
John C. L. Leslie
By Watson, Cole, Grindle & Watson
Attys.

United States Patent Office 3,237,713
Patented Mar. 1, 1966

3,237,713
ACOUSTICAL CHAMBER
John C. L. Leslie, Albuquerque, N. Mex., assignor to Educational Research Associates, Inc., Albuquerque, N. Mex., a corporation of New Mexico
Filed July 16, 1964, Ser. No. 383,182
2 Claims. (Cl. 181—31)

This invention relates to acoustical chambers and more particularly it relates to acoustical chambers for processing sound waves to confine them to a region in the vicinity of a single recipient.

In the field of teaching machines, it is imperative to provide apparatus which does not in any way detract a person from the simple mechanical procedures of learning and responding to questions. Where audio recordings are used, such as in audio-visual teaching machines and language laboratories, a student may be required to sit for long periods of time listening to audio presentations. The audio signals are generals produced individually by way of ear-phones, since it is undesirable to disturb others in a classroom. However, ear-phones are entirely unsatisfactory in use with teaching machines since they are unnatural, and tend to prevent a student from full time undistracted attention to the teaching program. It is difficult to initially adjust them comfortably to different people, they are warm and unsanitary, and they restrict freedom of nervous movements, etc. In the case of female students, ear-phones are inconsistent with hair styling.

Accordingly, it is an object of the present invention to produce an improved audio presentation device, which is particularly adapted for use with teaching machines.

Another object of the invention is to provide a comfortable and universal private listening device which can be placed side by side with others in a room without disturbance.

In accordance with the invention therefore, an acoustical chamber is provided for use of an individual, wherein the sound waves are confined substantially within the chamber. This chamber takes the form of a head surround piece which may be the topmost portion of a seat, and which thus is mounted for use without requiring physical contact with the listener.

The invention is considered in more detail with reference to the accompanying drawing, wherein.

Figure 1:
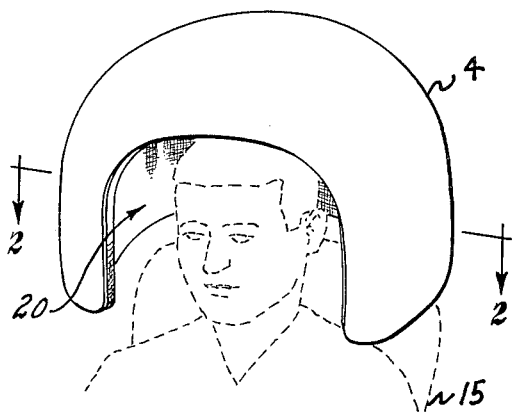
FIGURE 1 is a perspective view of an acoustical chamber provided in accordance with the invention as mounted on a chair occupied by a listener.
Figure 3:
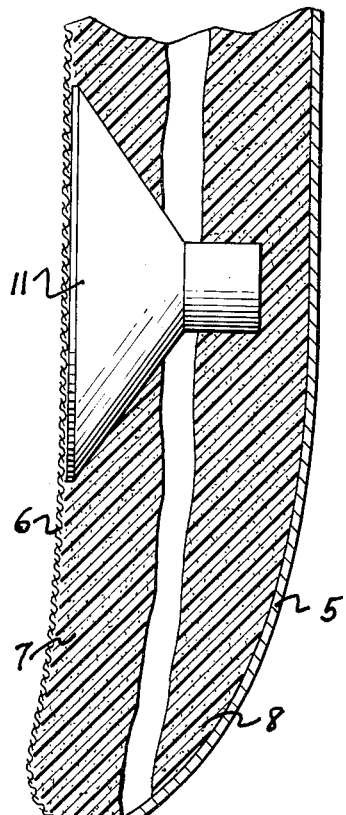
FIGURE 3 is an enlarged cross section view of the construction intersected by lines 3—3 of FIGURE 2.

As may be seen from the drawing each acoustical chamber 4 comprises a head surround member with a hardened outer shell wall construction 5 of steel or equivalent hardened supporting material. The interior surface wall 6 comprises a fabric or other sound absorbent outer surface overlaying a body 7 of acoustically absorbing material such as felt. Also a further body 8 of such material is affixed to the inner surface of the outer shell to prevent any audio vibrations thereof and tending to confine all signals in the audio range within acoustic chamber 4.

Figure 2:
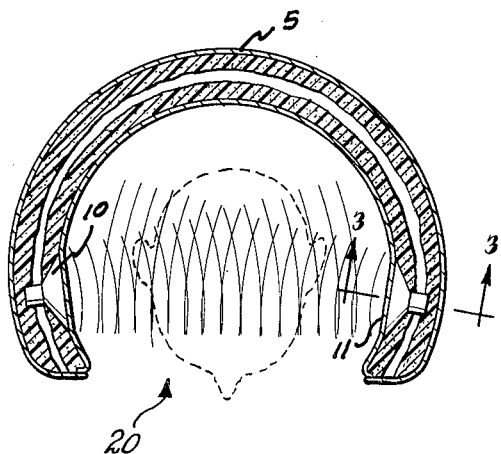
FIGURE 2 is a cross section view of the acoustical chamber taken along lines 2—2 of FIGURE 1.

The chamber is curved as shown in FIGURE 2, to permit mounting of two directional audio sources such as speakers 10 and 11 with an orientation confining their directed sound waves within the chamber, so that the acoustic material 7 will prevent any significant reflections which send audio energy out the front opening. The front opening 20 is large enough to permit free access of a listener's head and the entire chamber permits a considerable degree of freedom of movement. In this manner all the objectives of the invention are realized in permitting the listener to naturally listen to sound emanating from the two speakers which can be connected for stereophonic reproduction if desired. The volume of sound may be adjusted as in any conventional audio system to suit the needs of the listener.

One significant feature of the acoustic chamber 4 is that it is mounted on a fixed mount such as chair 15 so that it is not in any manner supported or worn by the listener. This prevents any feeling of uncomfort or confinement which would detract from the learning process in a classroom environment.

Accordingly the present invention has improved the state of the art in audio listening devices by providing a novel acoustic chamber as defined in the following claims.

I claim:
1. An acoustical chamber adapted for use by a student in a side-by-side classroom arrangement to permit personal audio instructions through loud speakers within the chamber while confining the audio energy therein to prevent interference, comprising in combination,
 a generally hemispherically-shaped head surround shell of substantially rigid construction adapted to be spaced from the student's head on all sides, said shell having a generally U-shaped opening on one side to form a front entryway opening to permit visual communication with the student;
 means supporting said shell to hold the same away from contact with the head of the student;
 a layer of acoustically absorbing material lining said shell to absorb the audio energy therein,
 and a pair of audio loud speakers located on opposite sides of said shell in said layer of absorbing material out of contact with the student's ears, each speaker being oriented to direct sound waves directly toward the adjacent ear of the student in a sound wave path substantially confined within the chamber.
2. An acoustical chamber as defined in claim 1 wherein is further provided a second layer of acoustically absorbing material overlying the first mentioned layer, said second layer being spaced from said first layer on all sides to reduce audio vibrations within said chamber.

References Cited by the Examiner
UNITED STATES PATENTS

| 908,444 | 1/1909 | Burrhus | 179—183 |
| 2,370,359 | 2/1945 | McCart | 179—183 |
| 2,804,933 | 9/1957 | Imhof | 181—31 |
| 3,088,002 | 4/1963 | Heisig | 179—156 |

FOREIGN PATENTS 1,014,167    8/1957    Germany.

LEO SMILOW, Primary Examiner.
LEYLAND M. MARTIN, Examiner.
STEPHEN J. TOMSKY, Assistant Examiner.